United States Patent

[11] 3,559,523

| [72] | Inventor | Paul Karlan<br>620, Ogden Ave., Mamaroneck, N.Y. 10543 |
|---|---|---|
| [21] | Appl. No. | 827,805 |
| [22] | Filed | May 26, 1969 |
| [45] | Patented | Feb. 2, 1971 |

[54] RECIPROCATING BLADE SAW HAVING BLADE-TENSIONING MEANS RESPONSIVE TO DIRECTION OF MOVEMENT
5 Claims, 8 Drawing Figs.

[52] U.S. Cl. .................................................. 83/647, 83/201.14, 83/699
[51] Int. Cl. .................................................. B26d 5/08
[50] Field of Search .......................................... 83/647, 698, 699, 201.14; 143/27, 69

[56] References Cited
UNITED STATES PATENTS

| 2,011,611 | 8/1935 | Blum | 83/647X |
| 2,337,629 | 12/1943 | Shortell | 83/647X |
| 3,330,175 | 7/1967 | Bridges | 83/647X |

*Primary Examiner*—Frank T. Yost
*Attorney*—Charles E. Temko

ABSTRACT: A reciprocating flexible blade-type saw in which the blade is carried by a C-shaped frame. Means is provided for varying the tension placed upon the blade, so that the blade is under greater tension during a cutting stroke than a return or idle stroke.

RECIPROCATING BLADE SAW HAVING BLADE-TENSIONING MEANS RESPONSIVE TO DIRECTION OF MOVEMENT

This invention relates generally to the field of reciprocating type saws, and more particularly to an improved type of precision saw suitable for use by jewelers, and for making precision dies which have heretofor been cut by hand. In hand saws of comparable type, the blade is of thin flexible elongated configuration, somewhat resembling a miniaturized hacksaw, and the same is used in such a manner that the blade contacts the workpiece only on the cutting stroke, so as not to damage the blade by rubbing on the idle or return stroke.

The precise nature of the cutting action, which requires a high degree of manual skill, has prevented saws of this type from being automated to machine tool form, and the cost of such hand operations has progressively increased to the present day.

It is therefore among the principal objects of the present invention to provide an improved automated jewelry-type precision saw which can precisely simulate the action of hand operated saws, that is to say in which the cutting teeth on the blade contact the work only during a cutting stroke, and make relatively light if an any contact during the return or idle stroke.

Another object of the invention lies in the provision of an improved precision saw of the class described in which the above mentioned light contact with the work during the return stroke is achieved by slackening the tension exerted upon the blade during the return or idle stroke.

A further object of the invention lies in the provision of an improved precision type saw capable of operating at very high speed, with a minimum of attendance on the part of the operator, thereby materially lessening the cost of producing intricate forms of workpieces heretofor made by hand in the prior art.

A further object of the invention lies in the provision of an improved precision saw possessed of the above advantages, in which the cost of fabrication may be of a reasonably low order, with consequent wide sale, distribution and use.

Yet another object of the invention lies in the provision of an improved saw which may have a minimum number of moving parts consistent with efficient function, thereby permitting a relatively long, trouble-free useful service life.

A further object of this invention lies in the provision of a sawing machine which will mechanize the sawing of intricate portions of a cut which have previously been performed by hand.

Yet another object of the invention lies in the provision of means for sawing precision work at an angle with respect to the principle axis of the work, to thereby provide for die clearance.

A further object of the invention lies in the provision of a sawing device suitable for slitting operations.

A feature of the invention lies in the provision of means for progressively advancing the cutting blade into the work, as the cutting action progresses.

These objects and features, as well as other incidental ends and advantages, will more fully appear in the progress of the following disclosure and be pointed out in the appended claims.

In the drawing, to which reference will be made in the specification, similar reference characters have been employed to designate corresponding parts throughout the several views.

Figure 1:
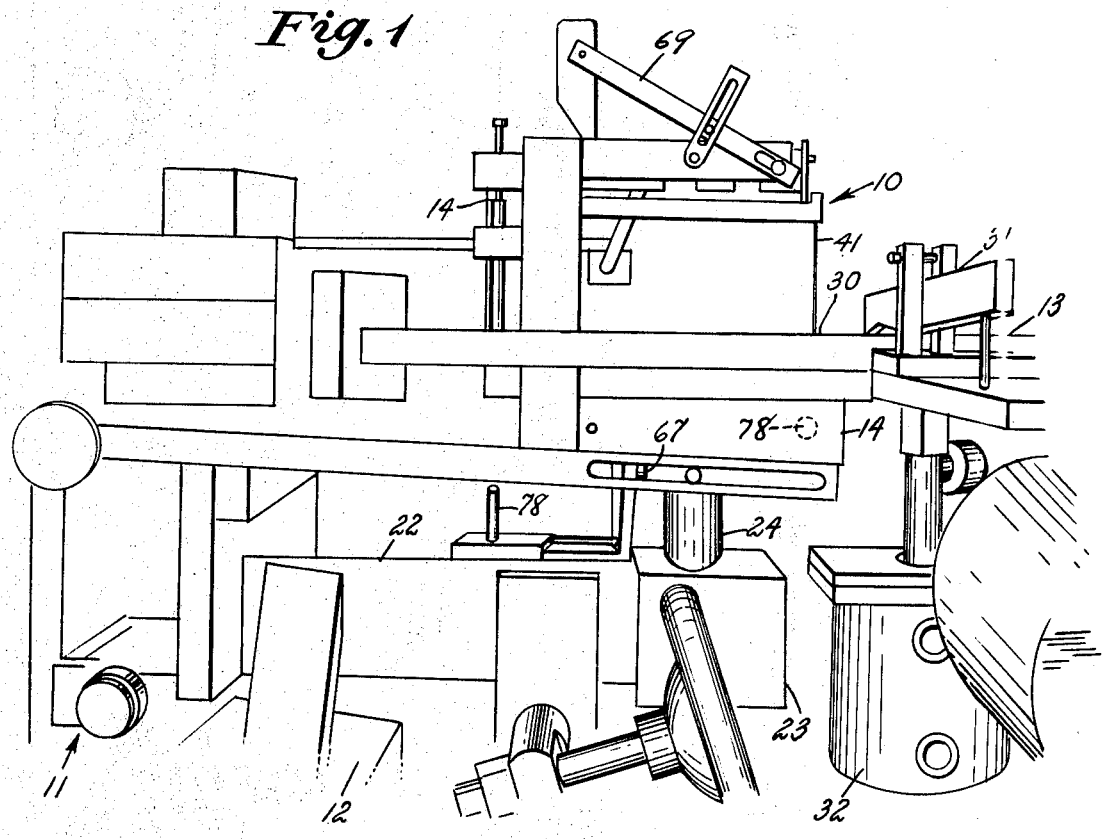
FIG. 1 is a fragmentary side elevational view of an embodiment of the invention.

In accordance with the invention, the device, generally indicated by reference character 10, comprises broadly: a base element 11, prime mover means 12, work supporting means 13, a reciprocating saw frame element 14, and saw advancement means 15.

The base element 11 includes suitable structure members for supporting the device upon a floor or other horizontal supporting surfaces (not shown), and may be fabricated following techniques well known in the machine tool art.

The prime mover means 12 includes an electric motor (not shown) driving an output shaft (also not shown) disposed within a horizontally disposed casing 22 which forms bearing therefor. The shaft drives a crank and connecting rod-type action 23 connected to a vertical shaft 24 attached to the lower portion of the saw frame element 14. The shaft 24 rides in bearings 25 fixed to the base element 11.

The work supporting means 13 includes a work-holding table 30, and a work holding clamp 31 maintained there against by an air cylinder 32. The table 30 forms an opening (not shown) through which the saw frame element may reciprocate in a substantially vertical plane.

The saw frame element 14 includes a vertical frame member 36, a lower horizontal frame member 37, and an upper horizontal frame member 38. The lower horizontal frame member 37 is provided with clamp means 39 engaging the lower end 40 of a cutting blade 41. Extending horizontally from the vertical frame member 36 is an elongated upper resilient member 42, including a fixed end 43 and a free end 44, having blade-clamping means engaging the upper end of the blade 41.

Mounted on the upper horizontal frame 38 is a tension varying member 46 arranged for pivotal movement about a pintle 47. A contact member 48 is slidably adjustable upon one end of the member 46. The relatively free end 49 is normally urged downwardly by a spring 50 bearing thereupon. The upper end engaging a retaining member 51 of the upper horizontal frame member 38. A vertically arranged threaded adjustment screw 52 is adapted to selectively bear upon the resilient member 53 to transmit a downwardly directed force thereby.

Figure 3:
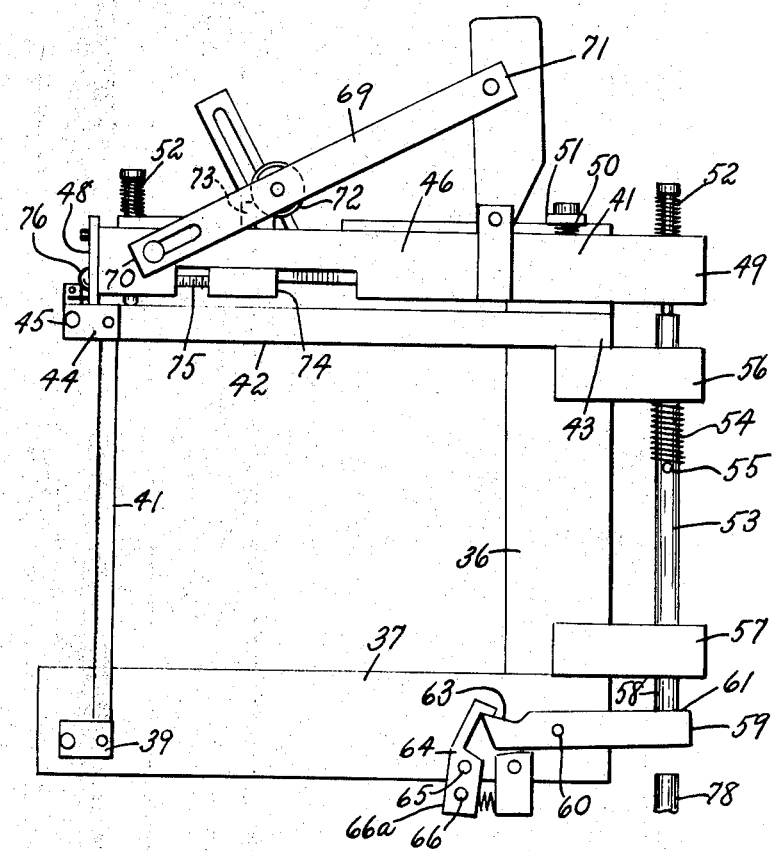
FIG. 3 is a side elevational view of the reciprocating frame element which supports the cutting blade, comprising a part of the disclosed embodiment.
Figure 4:
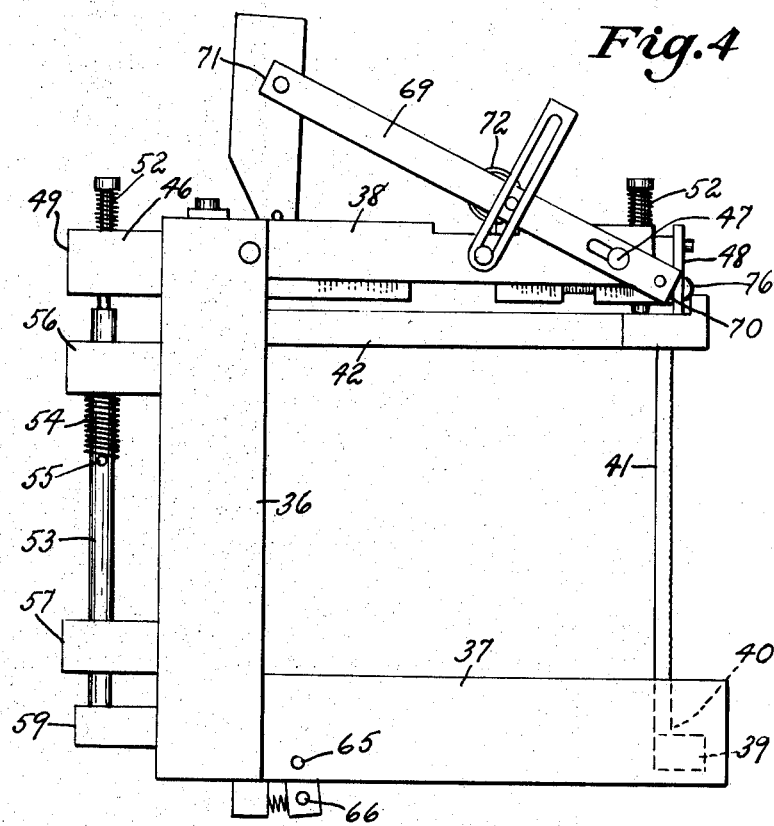
FIG. 4 is a side elevational view of the frame element, showing the side opposite that seen in FIG. 3.
Figure 5:
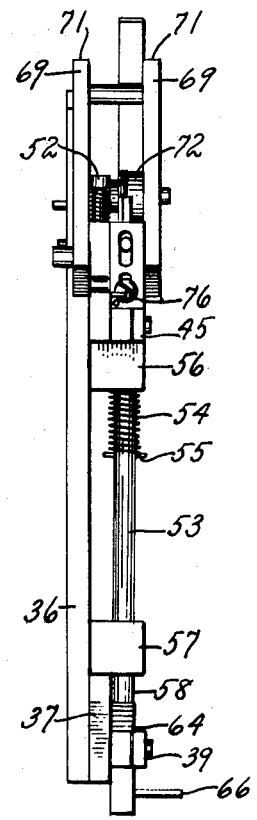
FIG. 5 is an end elevational view of the frame element.
Figure 6:
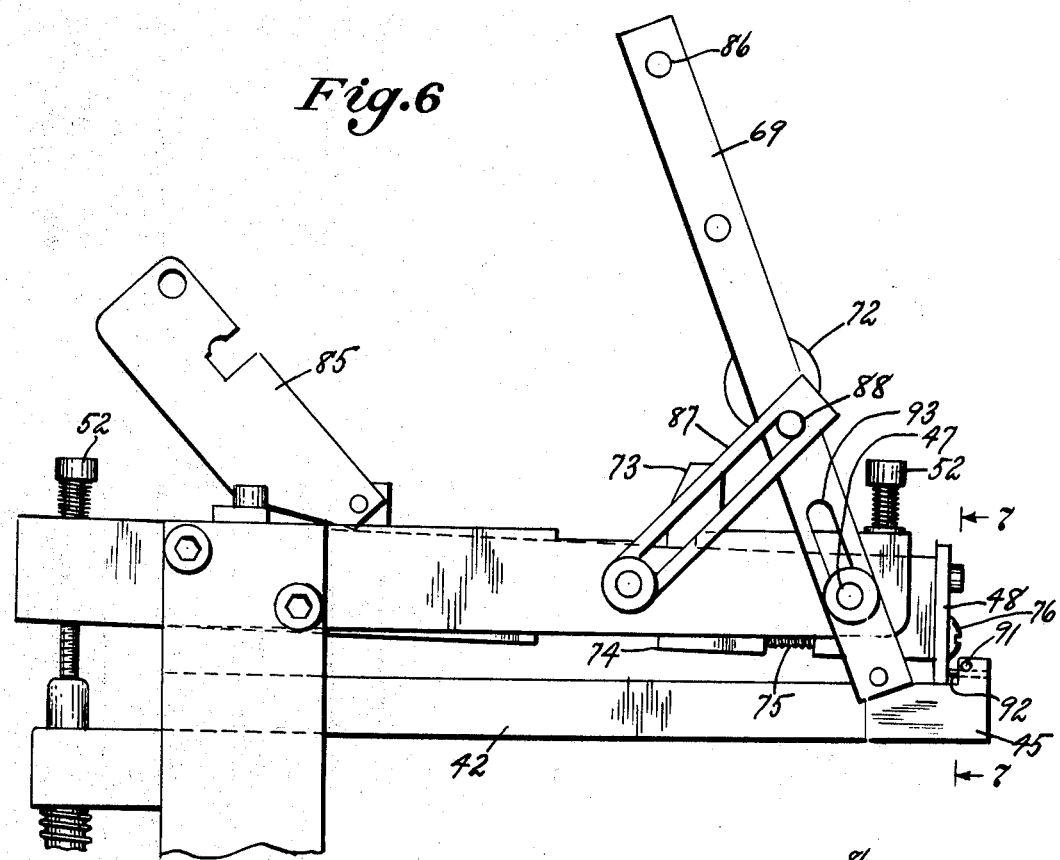
FIG. 6 is a side elevational view of the frame element similar to that seen in FIG. 4 but showing certain of the component parts in altered relative position.
Figure 7:
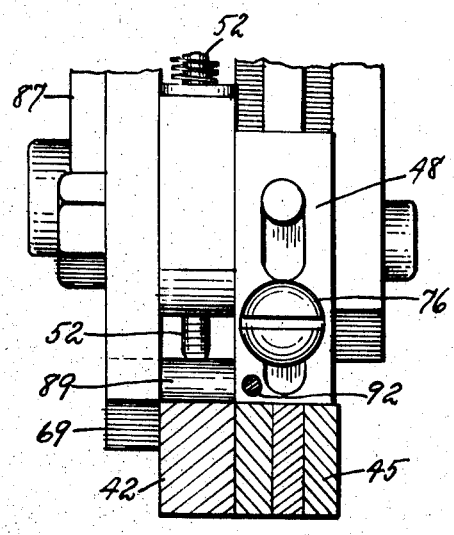
FIG. 7 is a sectional view as seen from the plane 7–7 in FIG. 6.
Figure 8:
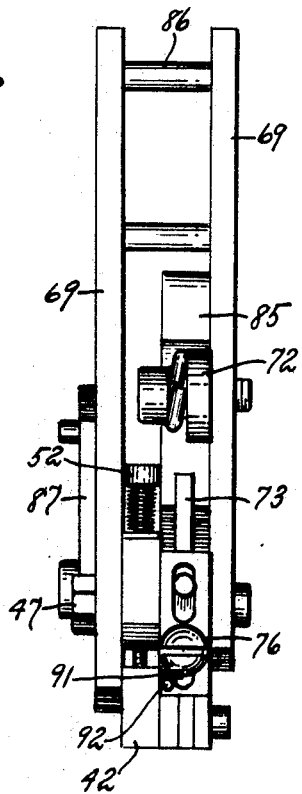
FIG. 8 is an end elevational view as seen from the plane 8–8 in FIG. 6.

Referring to FIGS. 6, 7 and 8, there is illustrated the manner of installing a saw blade 41, and adjusting the device so that tension will be slacked off to the proper degree during the return stroke, in which the teeth of the blade are sliding with respect to the work, rather than cutting. Since the lower horizontal frame member 37 is relatively rigid, and the lower end of the blade 41 is secured thereto by clamp means 39, it is necessary to flex the resilient member 42 downwardly at the time of clamping the upper end of the blade 41 by the means 45. This is accomplished by moving a locking member 85 (FIG. 6) to a leftward position to disengage a pintle 86 at the upper end of a lever 69, and rotating the lever about a pintle 47 to the limit permitted by a guide 87 cooperating with a pin 88. During this movement, a lower pintle 89 goes beneath the lower end of the adjustment screw 52, and bears against an upper surface of the resilient member 42 to produce the required downward deflection relative to the member 37, and maintain this deflection during the installation of the blade 41. During this deflection, a transversely extending pin 91 on the means 45 engages a pin 92 on the contact member 48 and pulls it downwardly to maintain it in contact with the upper ends of the means 45. It will be observed that as the pintle 89 engages the lower end of the screw 52, the lever 69 moves translationally within the slots 93 which permit relative movement of the pintle 47. After installation of the blade, the lever is returned to the position shown in FIGS. 3 and 4, this movement resulting in relative upward movement of the means 45, and contact with the lower edge of the contact member 48 is maintained. With the return of the lever 69 to locked condition, a medially positioned bearing 72 engaged the upper end of lever 73, the lower end therefor engaging a block 74 having a threaded bore, the bore engaging a screw 75. The head 76 of the screw 75 bears directly against the contact member 48 to clamp it against the end surface of member 46. When this clamping occurs, the lower edge of the contact member 48 is still contacting the blade-clamping means 45, and its final adjustment is dependent upon the position assumed by the resilient member 42 when the blade 41 is fully tensed.

During reciprocation of the saw frame element 14, pivoting movement of the member 46 against the action of the spring 50 is provided by a reciprocating rod 53, normally urged downwardly by a spring 54 cooperating with a pin 55 and an upper rod bearing 56. A lower rod bearing 57, similar to the bearing 56 is also secured to the vertical frame member 36. The lower end 58 of the rod 53 selectively contacts a lever 59 arranged for pivotal movement about a pintle 60. A first end 61 therefor lies within the path of travel of the rod 53, while a second end is provided with a surface 63 periodically engageable with a locking pawl 64 supported on a pintle 65 for rotation thereabout. A transversely extending pin 66 provides for manual disengagement of the pawl, and a cam 67 on the base element 11 serves to open the pawl at the completion of the upward stroke of the frame element, thereby resuming the tension on the blade for the downward cutting stroke.

Figure 2:
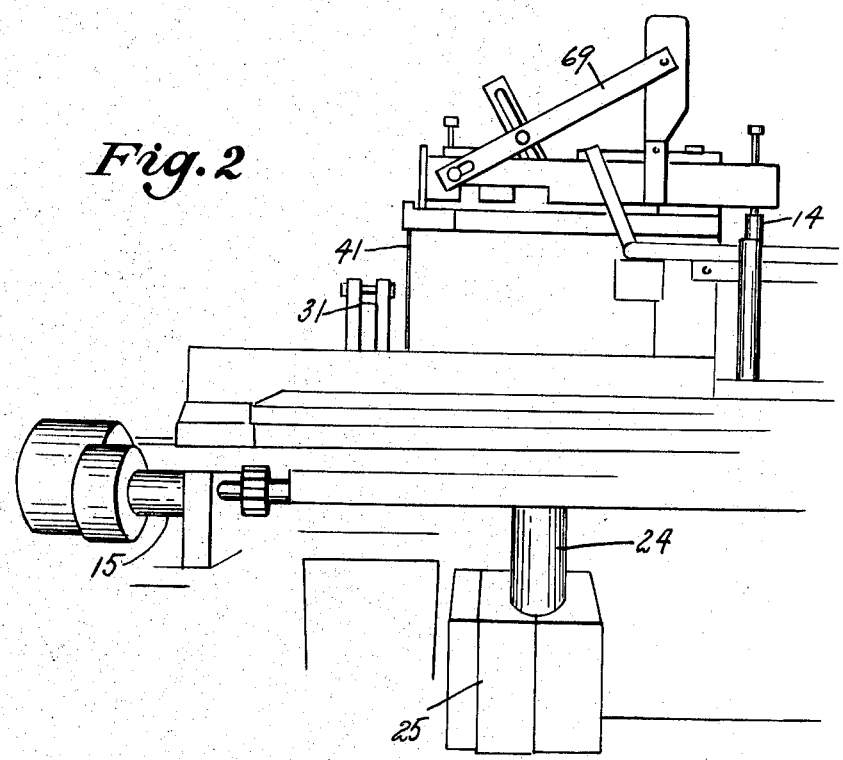
FIG. 2 is a second side elevational view thereof showing the side opposite that seen in FIG. 1.

The saw advancement means 15 may be of a lead screw type seen in FIG. 2, pawl advancement means (not shown) being operated with each reciprocation of the saw frame element 14 to incrementally rotate the lead screw in well-known ratchet feed manner.

Operation of the device will be apparent from a consideration of the drawings. At the beginning of the downward of cutting stroke, the member 46 controls the tension of the resilient member 42 through contact member 48. At the completion of the cutting stroke, when the frame element 14 is in its lowermost position, the lower end of the rod 53 strikes the end 61 of the lever 59, which end in turn contacts a stop 78 (FIG. 1) resulting in raising the rod against the spring 54 to a point where the pawl 64 engages the surface 63 thus maintaining the rod in an upper translational position. This locking action continues during the return or upper stroke of the element 14, until a point where a surface 66a of the pawl 64 strikes a corresponding cam 67 to release the rod 53 and allow the tension to be resumed for a subsequent cutting stroke. While the rod 53 is in its uppermost position, the tension varying member 46 has been pivoted about the pintle 47, to result in the contact member 48 bearing upon the clamping means 45 to relieve the tension in the blade 41 the requisite degree.

I wish it to be understood that I do not consider the invention limited to the precise details of the structure shown and set forth in this specification, for obvious modifications will occur to those skilled in the art to which the invention pertain.

I claim:

1. In a flexible blade reciprocating type saw, a reciprocating frame element, means on said frame element for engaging a blade substantially at the ends thereof, means for imparting substantial rectilinear movement to said frame element along a given axis of movement to said frame element along a given axis of movement, and means for imparting increased tension upon said blade when said frame element is moving in a first direction along said axis, and diminishing said tension when said frame element is moving in a second opposite direction.

2. Structure in accordance with claim 1, said frame element including an elongated resilient member having a principal axis perpendicular to the axis of said blade, means responsive to the direction of movement of said frame element bearing upon said resilient member with a force dependent upon the direction of movement of said frame element parallel to the axis of said blade.

3. Structure in accordance with claim 2, said last mentioned means including a tensioning member having a line of action opposite that of said elongated resilient member, means relieving the force exerted by said tensioning member upon the commencement of cutting stroke by said frame element, locking means for said last-mentioned means, and means operated at the completion of a cutting stroke for releasing said locking means.

4. Structure in accordance with claim 3, including means for manually releasing tension on said resilient member to allow engagement of a cutting blade upon said frame element.

5. Structure in accordance with claim 4, including a lever pivotally mounted on said frame element, a camming pin on said lever, a threaded screw on said frame element bearing upon said resilient member said pin being insertable between said threaded screw and said resilient member.